US010655657B2

(12) United States Patent
Hurley

(10) Patent No.: US 10,655,657 B2
(45) Date of Patent: May 19, 2020

(54) CONNECTING APPARATUS

(71) Applicant: Travis Hurley, Littleton, CO (US)

(72) Inventor: Travis Hurley, Littleton, CO (US)

( * ) Notice: Subject to any disclaimer, the term of this patent is extended or adjusted under 35 U.S.C. 154(b) by 53 days.

(21) Appl. No.: 15/990,742

(22) Filed: May 28, 2018

(65) Prior Publication Data
US 2019/0360511 A1 Nov. 28, 2019

(51) Int. Cl.
A44B 11/25 (2006.01)
F16B 1/00 (2006.01)
F16B 17/00 (2006.01)
B60R 11/00 (2006.01)

(52) U.S. Cl.
CPC .............. F16B 1/00 (2013.01); B60R 11/00 (2013.01); F16B 17/00 (2013.01); B60R 2011/0057 (2013.01); F16B 2001/0035 (2013.01)

(58) Field of Classification Search
CPC .... F16B 1/00; F16B 2001/0035; B60R 11/00; B60R 11/057; B60R 2011/0057; A44D 2203/00; H01F 7/0263; Y10T 292/11; B29C 43/222
See application file for complete search history.

(56) References Cited

U.S. PATENT DOCUMENTS

| 6,981,391 | B2* | 1/2006 | Suzuki | A44C 5/2076 24/303 |
| 7,152,282 | B2* | 12/2006 | Costa | A44C 5/20 24/303 |
| 7,775,567 | B2* | 8/2010 | Ligtenberg | E05C 19/16 292/251.5 |
| 8,336,492 | B1* | 12/2012 | Barley | A01K 5/00 119/51.04 |
| 8,484,809 | B2* | 7/2013 | Fiedler | A45C 13/1069 220/230 |
| 8,914,951 | B2* | 12/2014 | Gaudillere | A44B 11/266 24/303 |
| 9,033,377 | B2* | 5/2015 | Day | E05C 19/16 292/251.5 |
| 9,581,180 | B2* | 2/2017 | Lien | F16B 2/10 |
| 9,677,854 | B1* | 6/2017 | Tran | F41G 11/003 |
| 10,085,521 | B2* | 10/2018 | Chen | A41F 1/002 |
| 2002/0000024 | A1* | 1/2002 | Grunberger | A44B 11/2592 24/303 |
| 2002/0112323 | A1* | 8/2002 | Nire | A41F 1/002 24/303 |

(Continued)

Primary Examiner — Jason W San
(74) Attorney, Agent, or Firm — Roger A. Jackson

(57) ABSTRACT

A connecting apparatus removably engages first and second articles to one another, the apparatus including a beam with a first protrusion ridge being attached to the first article, a housing with a first aperture with a slidable channel having a second protrusion ridge disposed within the housing, the first and second ridges removably engage, the housing is attached to the second article, resulting in the first and second articles being removably engaged to one another. Operationally, the beam is pushed into the housing first aperture until the first ridge contacts and deflects the second ridge with continued pushing the second ridge returns to an un-deflected state with the first and second ridges interlocked to one another, the channel is selectively slid away from the beam to disengage the first and second protrusion ridges from one another to separate the channel and the beam, thus separating the first and second articles.

13 Claims, 14 Drawing Sheets

(56) References Cited

U.S. PATENT DOCUMENTS

| | | | | |
|---|---|---|---|---|
| 2003/0005558 A1* | 1/2003 | Wong | A41F 1/006 | 24/303 |
| 2003/0229974 A1* | 12/2003 | Zemer | A44C 5/2076 | 24/303 |
| 2004/0016089 A1* | 1/2004 | Grunberger | A41F 1/002 | 24/303 |
| 2004/0107547 A1* | 6/2004 | Chung | A44B 11/258 | 24/303 |
| 2006/0133894 A1* | 6/2006 | Bouru | F16B 1/00 | 403/373 |
| 2006/0174455 A1* | 8/2006 | Saitoh | E05B 47/0038 | 24/303 |
| 2010/0011544 A1* | 1/2010 | Wein | F16B 19/00 | 24/303 |
| 2012/0044031 A1* | 2/2012 | Ninomiya | A44C 5/2085 | 335/219 |
| 2012/0216373 A1* | 8/2012 | Fiedler | A01K 27/005 | 24/303 |
| 2014/0119812 A1* | 5/2014 | Kuebel | F16B 1/00 | 403/188 |
| 2014/0139976 A1* | 5/2014 | Santoni | F16B 1/00 | 361/605 |
| 2014/0250639 A1* | 9/2014 | Siwak | A01K 27/005 | 24/303 |
| 2015/0312452 A1* | 10/2015 | Hubert | H04N 5/2254 | 29/525.08 |
| 2015/0345524 A1* | 12/2015 | Frias | F16B 5/01 | 24/303 |
| 2016/0198838 A1* | 7/2016 | Abreu | A45F 5/02 | 224/183 |
| 2019/0069648 A1* | 3/2019 | Duncan | H01F 7/0263 | |
| 2019/0089299 A1* | 3/2019 | Hakenberg | H02S 20/25 | |
| 2019/0152559 A1* | 5/2019 | Jentzsch | A43B 1/0054 | |
| 2019/0210504 A1* | 7/2019 | Martinez | B60N 3/101 | |
| 2019/0352825 A1* | 11/2019 | Yanagisawa | D05B 73/12 | |

* cited by examiner

CONNECTING APPARATUS

RELATED PATENT APPLICATION

There is no related application.

FIELD OF THE INVENTION

The present invention generally relates to connecting apparatus for removably engaging articles to one another. More particularly, the present invention discloses a quick attach / release apparatus for removably holding a first article to a second article.

DESCRIPTION OF THE RELATED ART

There are numerous types of apparatus for removably connecting the first article to the second article, and given that the connection between the first and second articles needs to be secure as the articles can be heavy and / or mounted on a vehicle the goes off road thereby bouncing and shaking considerably, the first to second article connection needs to be fairly strong. In the past the connecting apparatus used mostly mechanical type mechanisms being either positive or non-positive connectors, also springs can be used to ensure attachment or flexible members such as clasps with interlocking edges, of course a problem with either spring or flexible connectors, is that the stronger the connection the more effort it take to engage and dis-engage the connector being a design drawback.

Magnets have been utilized in the past to help strengthen the closed state condition as between the first and second articles with needed manual added closing force applied by the user, however, the magnets then make the separating of the first and second articles more difficult due to their constant holding power, plus there is the problem of a user getting their fingers pinched in-between the magnets during the closing process in going from the open state to the closed state between the first and second articles.

Starting in the prior art for a magnetic type connecting structure in U.S. Pat. No. 8,484,809 to Fiedler, disclosed is an invention that relates to a mechanical and magnetic connecting type structure, that is to say a mechanical interlock by means of magnetic-force assistance, which is particularly suitable for closures such as those which are used on bags, rucksacks, and comparable objects. Wherein the Fiedler '809 the connecting structure has the following features being an interlock apparatus having at least one spring interlock element which moves in a direction and is arranged in one of the connecting modules. Further Fiedler '809 having a blocking piece for interlocking of the connecting modules, which blocking piece is arranged in the other connecting module, and having a movable unlocking element with a force-deflecting rising inclined sliding surface, which is likewise arranged in the other connecting module, and a magnet armature structure having at least one magnet which is arranged in one of the connecting modules, and at least one armature which is arranged in the other connecting module. In essence Fiedler '809 uses spring loaded sliding wedge surfaces for separating the magnetic surfaces easier.

Continuing in the prior art for the magnetic type connecting structure in U.S. Pat. No. 9,555,935 also to Fiedler discloses a closure device for removably connecting two parts, the closure device includes a connector receptacle into which the connector can be inserted in a closing direction for closing the device. In Fiedler '935 a slide is also included at the housing which for opening the closure device is shiftable along an opening direction different from the closing direction, further a detent spring element which in a closed position of the closure device latchingly holds the connector at the housing. Also in Fiedler '935 for opening the closure device the spring element is moved out of engagement with the connector by shifting the slide in the opening direction in order to release the connector from the housing so that in the open position of the closure device is separated from the housing and at least one guide element which guides the connector on insertion into the connector receptacle for closing the closure device into the closed position supports the connector against tilting relative to the closing direction when the slide is shifted for opening.

Further in the prior art in this same area of magnetic article connectors in U.S. Pat. No. 9,428,234 to Bopanna et al., disclosed is a pannier mounting system that enables a pannier container to be quickly and easily attached to and detached from a rack of a bicycle, motorcycle, or the like. In an embodiment of Bopanna, the system includes a rack attachment bracket that attaches to the rack, a first pair of connectors attached to the bracket, and a second pair of connectors attached to a side of the pannier container, also each of the first pair of connectors includes a magnet, and each of the second pair of connectors includes a magnet. Further, in Bopanna the attraction between magnets of the first pair of connectors and magnets of the second pair of connectors cause the first and second pairs of connectors to align with and connect to one another when brought within close proximity to one another, thereby attaching the pannier container to the bracket and a pannier release handle is used to detach the pannier container from the bracket. Bopanna, to overcome the magnetic force of attachment uses release handles to pivotally toggle the magnetic rings apart, thereby separating the pannier from the bicycle rack.

Also in the prior art for magnetic closure devices, in U.S. Pat. No. 9,572,410 to again to Fiedler disclosed is a lock device having a first connecting module and a second connecting module that can be arranged in a closing direction with one another that is mechanically lockably engaged in a closing position state and can be detached from one another by a movement of the first connecting module in an opening direction that which differs from the closing direction in a transverse manner. In Fiedler '410 in the connector locked state, the movement of the first connecting module is prevented via a spring lock element to positively lock the connector, however, taking the spring lock element out of engagement allows movement of the first connecting module thereby allowing the open position state and thus separation of the first and second connecting modules.

What is needed is a connecting apparatus that utilizes the benefit of magnetic attachment through the assistance is closing and connecting the first article and the second article to one another in the closed state, plus adding a positive locking mechanism for a backup so to speak on the magnetic closure so that the connecting apparatus is the closed state could not easily separate the first and second articles, wherein magnetic closing force alone would not be a mechanically positive lock like a hooking type latch. In addition, ideally the connecting apparatus would also have a mechanism to ease the separation of the magnets for placing the connecting apparatus into the open state to separate the first and second articles through a mechanical advantage type mechanism that by effecting a motion that would help to push the magnets apart—which without this would be burdensome to the user in separating the first and second articles via the connecting apparatus.

Therefore the challenge of the present invention is to have the connecting apparatus that utilizes the enhancement of magnets while overcoming the drawbacks of magnets while at the same time the connecting apparatus can custom fit itself to a multitude of different size first and second articles and to have the structural rigidity necessary to adequately protect the first and second articles, while at the same time having the ability to be used with a number of different sizes, weights, and configurations of the first and second articles.

SUMMARY OF INVENTION

Broadly, the present invention is of the connecting apparatus that removably engages the first article to the second article, the connecting apparatus including a beam with a first end portion and an opposing second end portion with a longitudinal axis spanning therebetween, the beam also including a proximal end portion and an opposing distal end portion with a plumb axis spanning therebetween, wherein the longitudinal axis and the plumb axis are positioned perpendicular to one another. Further the beam includes a first protrusion ridge that runs parallel to the longitudinal axis, wherein the ridge is disposed on the beam second end portion and on the distal end portion, the beam proximal end portion is adapted to attach to the first article, the beam also has a lateral axis that is perpendicular to both the longitudinal axis and the plumb axis.

Further included in the connecting apparatus is a housing that is constructed of a surrounding sidewall that is about a transverse axis, the sidewall terminating in a first aperture and an opposing second aperture, wherein the transverse axis spans therebetween, the surrounding sidewall and the first and second apertures define a housing interior, the housing first aperture is sized to receive the beam distal end portion that is disposed within the housing interior. The first aperture has a major axis and a perpendicularly positioned minor axis wherein both the major and minor axes are perpendicular to the transverse axis, the first aperture is divided into a first chamber and an opposing second chamber such that the first chamber is on one side of the minor axis along the major axis and the second chamber is on an opposing side of the minor axis along the major axis, the housing is also adapted to attach to the second article.

In addition included in the connecting apparatus is a channel having a base portion and a pair of flexible extension elements that each extend in a same direction being substantially parallel to one another from each side of the base, the channel also including a primary end portion and an opposing secondary end portion with an open side formed from a pair of margins of the pair of extension elements such that a lengthwise axis that spans therebetween the primary and secondary end portions. Further the channel has a sidewise axis that is positioned parallel to the channel base portion and the sidewise axis is positioned perpendicular to the lengthwise axis, the channel is slidably engaged to a portion of the sidewall such that the lengthwise axis is perpendicular to the transverse axis and the lengthwise axis is parallel to the major axis. Wherein the channel open side is in communication with the housing first aperture and the pair of extension element margins are sized to be larger than the housing first aperture to prevent the channel from extending therethrough the first aperture along the transverse axis, on one of the flexible extension elements a second protrusion ridge is disposed that runs parallel to the lengthwise axis facing the base on the secondary end portion such that the secondary end portion is adjacent to the first chamber through the slidably engaged channel to the sidewall.

Wherein operationally, the beam distal end portion is manually pushed into the housing first aperture until the first protrusion ridge contacts and deflects the second protrusion ridge on the flexible extension element with the second protrusion ridge returns to an un-deflected state with the first and second protrusion ridges interlocked to one another with the first protrusion ridge being closer to the base portion that the second protrusion ridge. Wherein the first and second protrusion ridges interlock prevents the beam and the housing from separating along the transverse axis and an interface between the first aperture and the beam precludes movement between the housing and the beam in the longitudinal axis and the lateral axis which results in precluded three axis movement as between the first and second articles in an attached operational state. Further operationally the first and second article can be separated by having sliding movement of the channel along the lengthwise axis to slide apart the interlock of the first and second protrusion ridges such that the channel secondary end portion is directly adjacent to the beam first end portion and the second chamber thus allowing the beam to separate from the channel along the transverse axis, thus separating the first article from the second article in a detached operational state.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 4 shows cross section cut 4-4 from FIG. 1, wherein FIG. 4 shows a view of the housing at the interface of the housing and the second article that shows the surrounding sidewall, the second aperture, the channel, the base, and the means for urging the channel in the preferred form of a spring all in the attached operational state;

FIG. 5 shows cross section cut 5-5 from FIG. 1, wherein FIG. 5 shows a view of the housing at the interface of the housing and the second article that shows the surrounding sidewall, the second aperture, the channel, the base, and the means for urging the channel in the preferred form of a spring all in the detached operational state;

FIG. 6 shows an opposing view of the housing in relation to FIGS. 4 and 5, wherein FIG. 6 shows the housing, the surrounding sidewall, the first aperture, the channel, the base, the manual sliding movement, all in the attached operational state, further shown are the extension elements, the margins, the second protrusion ridge, and the first and second chambers of the first aperture;

FIG. 7 also shows an opposing view of the housing in relation to FIGS. 4 and 5, wherein FIG. 7 shows the housing, the surrounding sidewall, the first aperture, the channel, the base, the manual fully slid apart interlock position of the channel, all in the detached operational state, further shown are the extension elements, the margins, the second protrusion ridge, and the first and second chambers of the first aperture;

FIG. 10 is cross section cut 10-10 from FIG. 6, wherein FIG. 10 shows the positional relationship of the housing sidewall, first and second apertures and the channel including the base, flexible extension elements, margins, the second protrusion edge, and the sizing of the margin to be larger than the first aperture;

FIG. 11 is cross section cut 11-11 from FIG. 6, wherein FIG. 11 shows the positional relationship of the housing sidewall, first and second apertures and the channel including the base, flexible extension elements, margins, and the sizing of the margin to be larger than the first aperture;

FIG. 12 is cross section cut 12-12 from FIG. 1, wherein FIG. 12 shows the positional relationship of the beam being inserted into the channel, wherein also shown is housing sidewall, first and second apertures and the channel including the base, flexible extension elements, margins, the second protrusion edge, and the sizing of the margin to be larger than the first aperture;

FIG. 13 is cross section cut 13-13 from FIG. 1, wherein FIG. 13 shows the positional relationship of the beam being further inserted into the channel, thus contacting and deflecting of the second protrusion edge by the first protrusion edge, wherein also shown is housing sidewall, first and second apertures and the channel including the base, flexible extension elements, margins, the second protrusion edge, and the sizing of the margin to be larger than the first aperture; and FIG. 14 is cross section cut 14-14 from both FIGS. 1 and 3, wherein FIG. 14 shows the positional relationship of the beam being fully inserted into the channel, thus forming the interlock as between the second protrusion edge and the first protrusion edge, wherein also shown is housing sidewall, first and second apertures and the channel including the base, flexible extension elements, margins, the second protrusion edge, and the sizing of the margin to be larger than the first aperture with the interlock forming the attached operational state.

REFERENCE NUMBERS IN DRAWINGS

Figure 1:
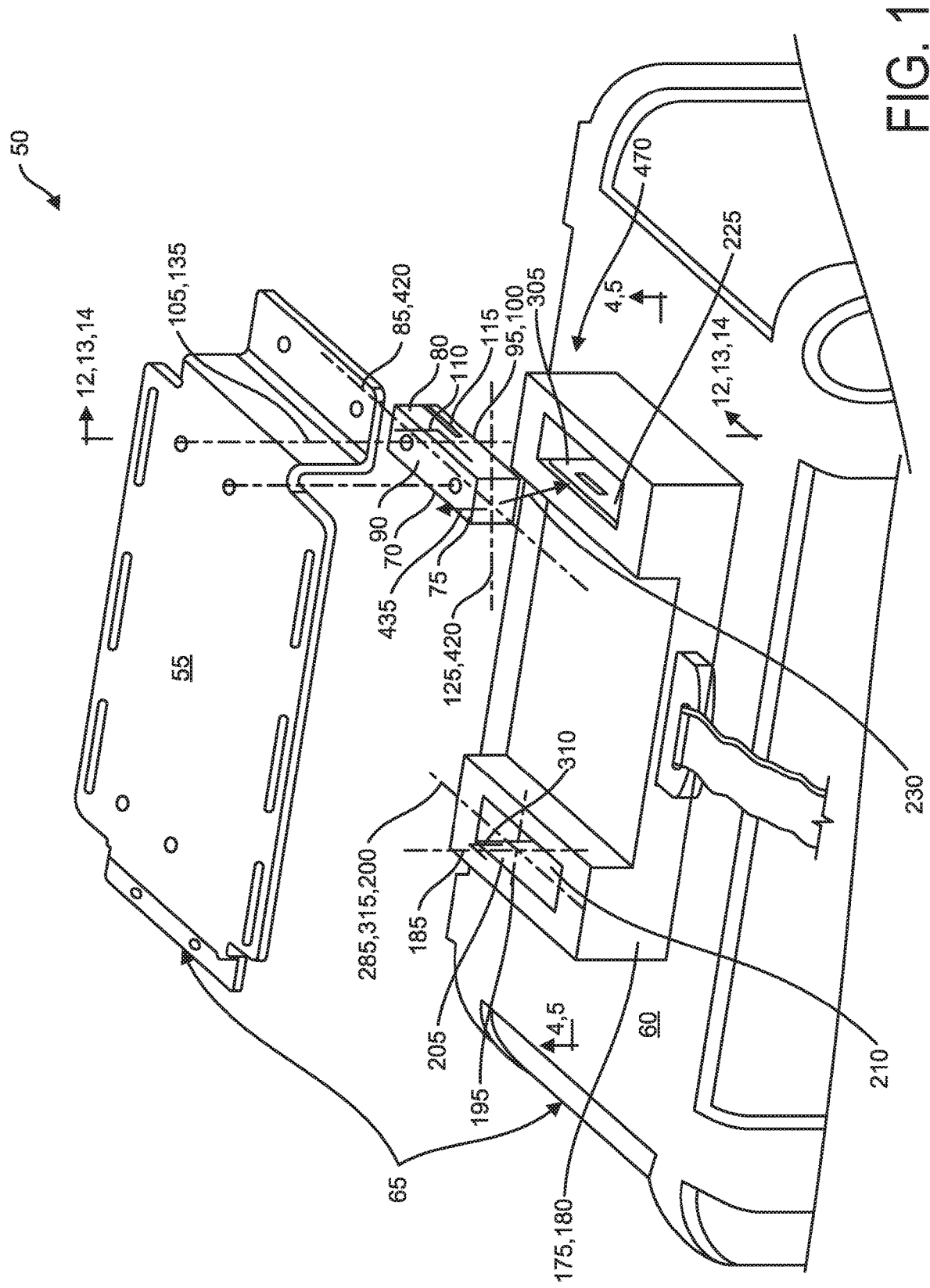
FIG. 1 shows an upper perspective view of the connecting apparatus with first and second articles separated vertically to show the alignment of the beam, housing, and channel in relation to the first and second articles, wherein the beam attaches to the first article and the housing attaches to the second article, wherein the channel is slidably engaged within the housing.

50 Connecting apparatus
55 First article
60 Second article
65 Removable engagement of the first article 55 to the second article 60
70 Beam
75 First end portion of the beam 70
80 Second end portion of the beam 70
85 Longitudinal axis of the beam 70
90 Proximal end portion of the beam 70
95 Distal end portion of the beam 70
100 Terminating edge of the distal end portion 95
105 Plumb axis of the beam 70
110 Perpendicular position of the longitudinal axis 85 and the plumb axis 105
115 First protrusion ridge
120 Parallel position of the first protrusion ridge 115 to the longitudinal axis 85
125 Lateral axis of the beam 70
130 Perpendicular position of the lateral axis 125 to both the longitudinal axis 85 and the plumb axis 105
135 Beam adapted to attach to the first article 55
140 First shelf section surface of the first protrusion ridge 115
145 Parallel position of the first shelf section surface 140 to the lateral axis 125
150 First boundary of the first protrusion ridge 115
155 First slide surface of the first protrusion ridge 115
160 First right triangle type shape of the first protrusion ridge 115
165 First side of the first right triangle type shape 160
170 First hypotenuse of the first right triangle type shape 160
175 Housing
180 Surrounding sidewall of the housing 175
185 Transverse axis of the housing 175
190 First aperture of the sidewall 180
195 Minor axis of the first aperture 190
200 Major axis of the first aperture 190
205 First chamber of the first aperture 190
210 Second chamber of the first aperture 190
215 Second aperture of the sidewall 180
225 Interior of the housing 175
230 Sizing and receiving of the beam distal end portion 95 into the first aperture 190
235 Housing adapted to attach to the second article 60
240 Channel
245 Base portion of the channel 240
250 Flexible extension element of the channel 240
255 Same direction extension of the flexible extension element 250
260 Substantially parallel position of the flexible extension elements 250
265 Primary end portion of the channel 240
270 Secondary end portion of the channel 240
275 Open side of the channel 240
280 Margins of the extension elements 250
285 Lengthwise axis of the channel 240
290 Sidewise axis of the channel 240
295 Parallel position of the sidewise axis 290 to the channel 240 base portion 245
300 Perpendicular position of the sidewise axis 290 to the lengthwise axis 285
305 Slidable engagement of the channel 240 to a portion of the sidewall 180
310 Perpendicular position of the lengthwise axis 285 to the transverse axis 185 for the slidable engagement 305
315 Parallel position of the lengthwise axis 285 to the major axis 200 for the slidable engagement 305
320 Communication of the channel 240 open side 275 to the first aperture 190 of the sidewall 180
325 The channel 240 secondary end portion 270 being adjacent to the first chamber 205 through the slidably engaged 305 channel 240 to the sidewall 180
330 Sizing of the element margins 280 to be larger than the first aperture 190 of the sidewall 180

335 Second protrusion ridge of the flexible extension element 250
340 Second shelf section surface of the second protrusion ridge 335
345 Perpendicular position of the second shelf section surface 340 to the sidewise axis 290
350 Second boundary of the second protrusion ridge 335
355 Second slide surface of the second protrusion ridge 335
360 Second right triangle type shape of the second protrusion ridge 335
365 Second side of the second right triangle type shape 360
370 Second hypotenuse of the second right triangle type shape 360
375 Parallel position of the second protrusion ridge 335 to the lengthwise axis 285
380 Facing position of the second protrusion ridge 335 to the base portion 245
385 Un-deflected state of the second protrusion ridge 335
390 Manually pushing movement of the beam 70 distal end portion 95 into the housing 175 first aperture 190
395 Contact and deflect of the second protrusion ridge 335 from the first protrusion ridge 115
400 Interlock of the first 115 and second 335 protrusion ridges
405 Precluding movement between the beam 70 and the housing 175 separating along the transverse axis 185 from the interlock 400
410 Interface between the first aperture 190 and the beam 70
420 Precluding movement between the housing 175 and the beam 70 in the longitudinal 85 and lateral 125 axes from the interface 410
425 Manually sliding movement of the channel 240 along the lengthwise axis 285 to slide apart the interlock 400
430 Fully slid apart interlock 400 wherein the channel 240 secondary end portion 270 is directly adjacent to the beam 70 first end portion 75 and the first aperture 190 second chamber 210 thus allowing the beam 70 to separate from the channel 240 along the transverse axis 185.
435 Movement allowed by the fully slid apart interlock 400 to separate the beam 70 from the channel 240 along the transverse axis 185
440 Opposing mirror images of the first 160 and second 360 right triangle type shapes
445 First 155 and second 355 slide surfaces contact one another
450 First 150 and second 350 boundaries cross one another
455 First 140 and second 340 shelf section surfaces coming into contact with one another to form the interlock 400
460 Means for urging the slidable engagement 305 of the channel 240 to the sidewall 180 portion such that the secondary end portion 270 is directly adjacent to the first aperture 190 first chamber 205
465 Spring that is disposed and affixed between the channel 240 and the housing 175 for the means 460
470 Attached operational state wherein the secondary end portion 270 is directly adjacent to the first aperture 190 first chamber 205 facilitating the interlock 400
475 Detached operational state wherein the secondary end portion 270 is directly adjacent to the beam 70 first end portion 75 and the first aperture 190 second chamber 210
480 First magnet disposed on beam 70 distal portion 95
485 Second magnet disposed on channel 240 base portion 245
490 First permanent magnet
495 Second permanent magnet
500 First permanent magnet 490 north pole
505 First permanent magnet 490 south pole
510 Second permanent magnet 495 north pole
515 Second permanent magnet 495 south pole
520 Attracting opposite north 500 and south 515 poles as between the first 490 and second 495 permanent magnets
525 Repelling like south 505 and south 515 poles as between the first 490 and second 495 permanent magnets

DETAILED DESCRIPTION

With initial reference to FIG. 1 shows an upper perspective view of the connecting apparatus 50 with first 55 and second 60 articles separated vertically to show the alignment of the beam 70, housing 175, and channel 240 in relation to the first 55 and 60 second articles, wherein the beam 70 attaches 135 to the first article 55 and the housing 175 attaches 235 to the second article 60, wherein the channel 240 is slidably engaged 305 within the housing 175.

Figure 2:
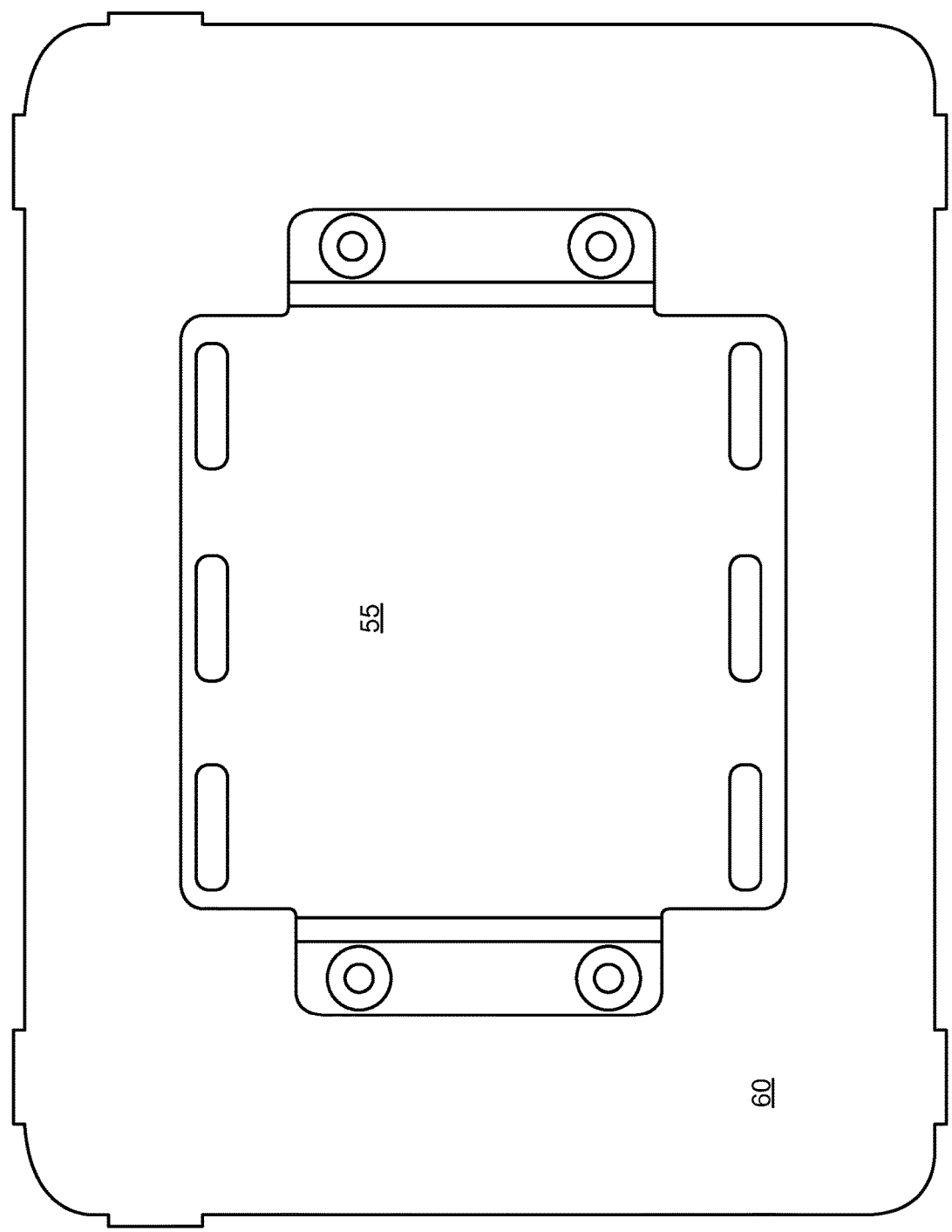
FIG. 2 shows a plan view of the first and second articles in the attached operational state via the connecting apparatus (not visible in this view)
Figure 3:
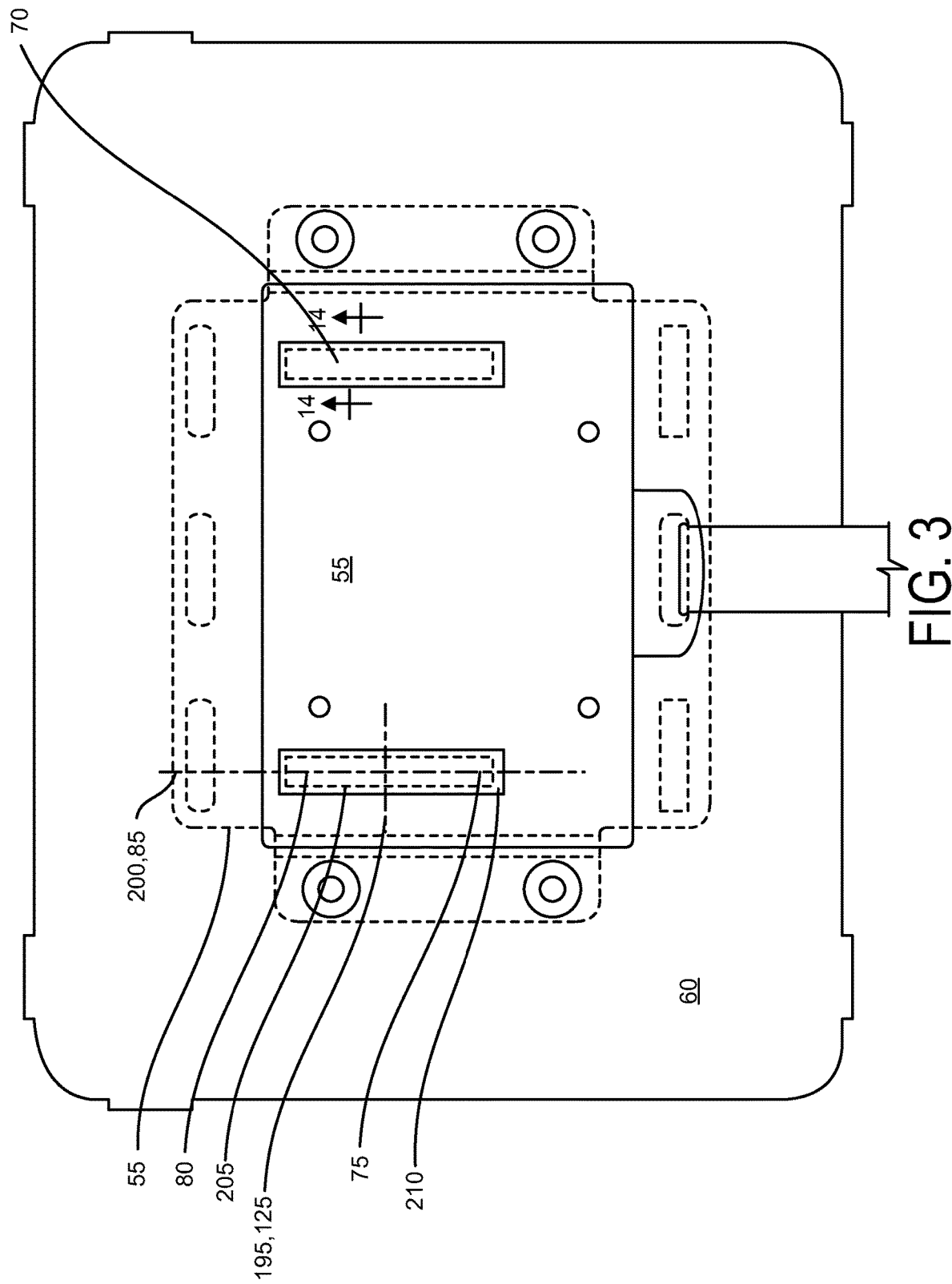
FIG. 3 shows the view inside of FIG. 2 as between the first and second articles to expose the beam and the first and second chambers.

Next on FIG. 2 shown is a plan view of the first 55 and second 60 articles in the attached operational state 470 via the connecting apparatus 50 (not visible in this view). Continuing, FIG. 3 shows the view inside of FIG. 2 as between the first 55 and second 60 articles to expose the beam 70 and the first 205 and second 210 chambers. Further, FIG. 4 shows cross section cut 4-4 from FIG. 1, wherein FIG. 4 shows a view of the housing 175 at the interface of the housing 175 and the second article 60 that shows the surrounding sidewall 180, the second aperture 215, the channel 240, the base 245, the means 460 for urging the channel 240 in the preferred form of a spring 465 all in the attached operational state 470.

Figure 5:
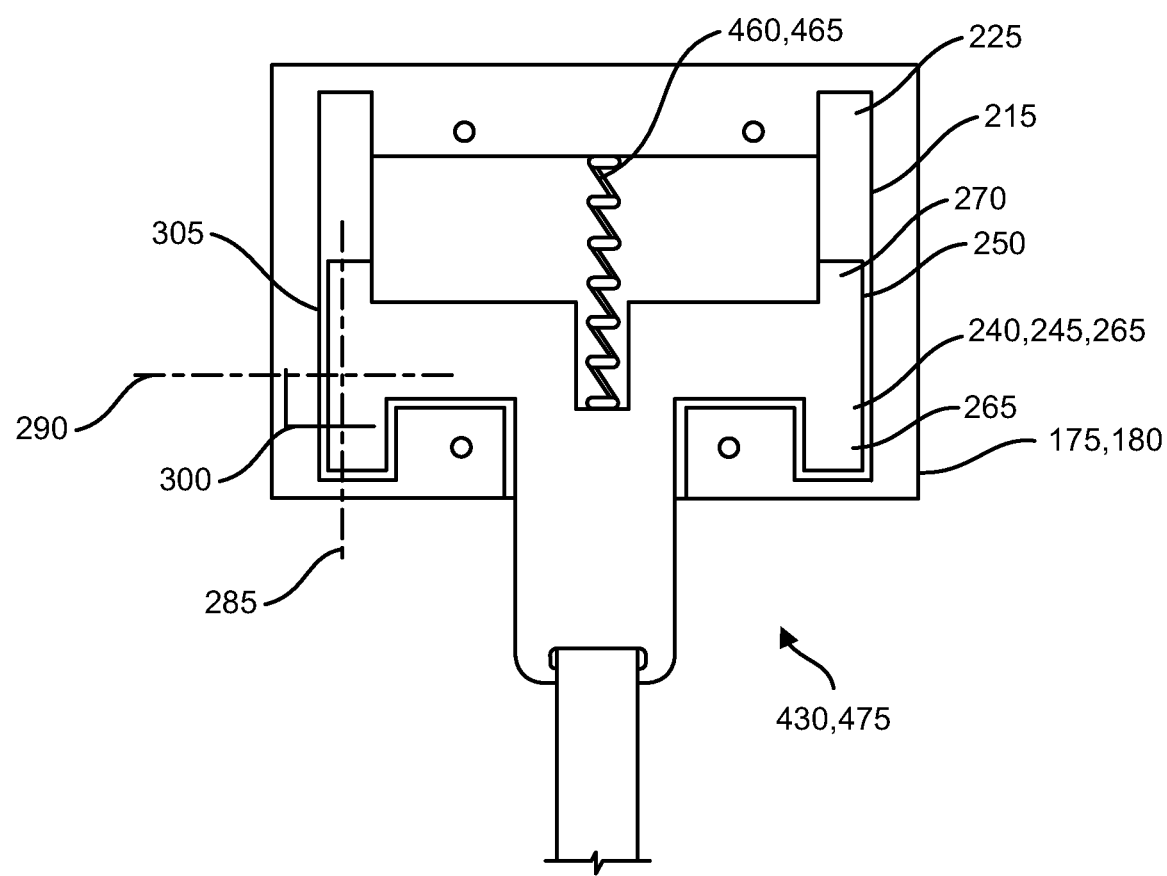

Continuing, FIG. 5 shows cross section cut 5-5 from FIG. 1, wherein FIG. 5 shows a view of the housing 175 at the interface of the housing 175 and the second article 60 that shows the surrounding sidewall 180, the second aperture 215, the channel 240, the base 245, the means 460 for urging the channel 240 in the preferred form of a spring 465 all in the detached operational state 475.

Figure 4:
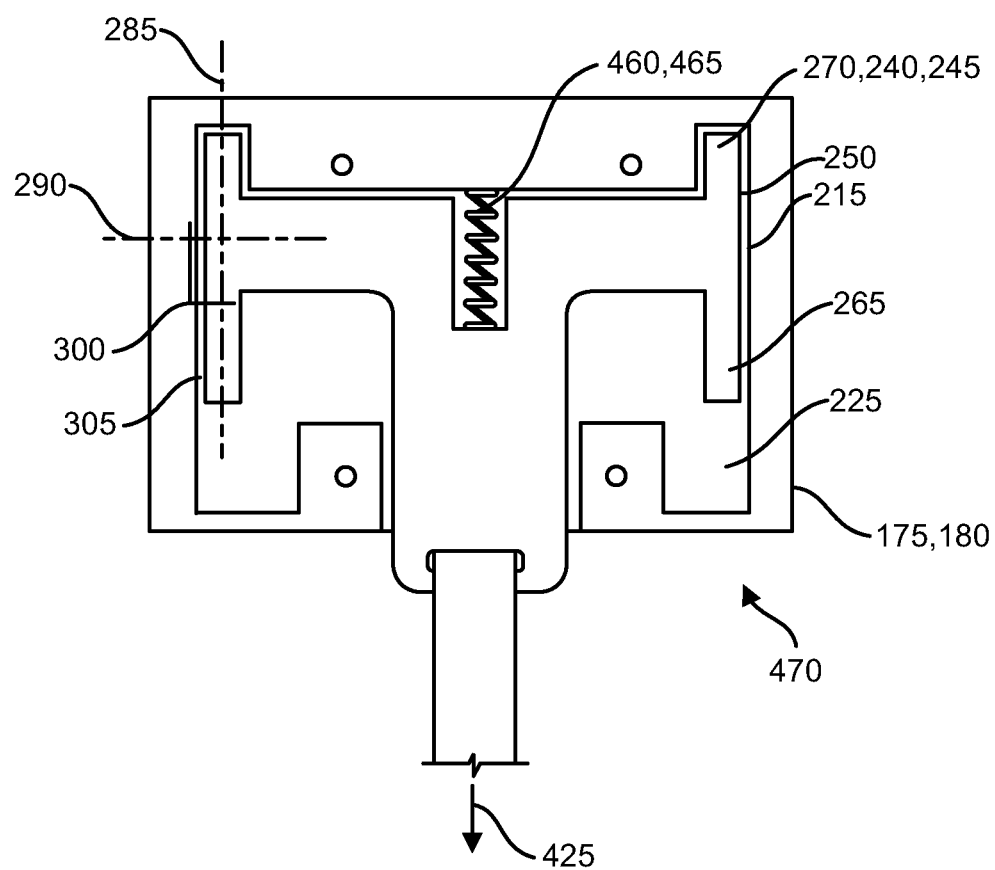
Figure 6:
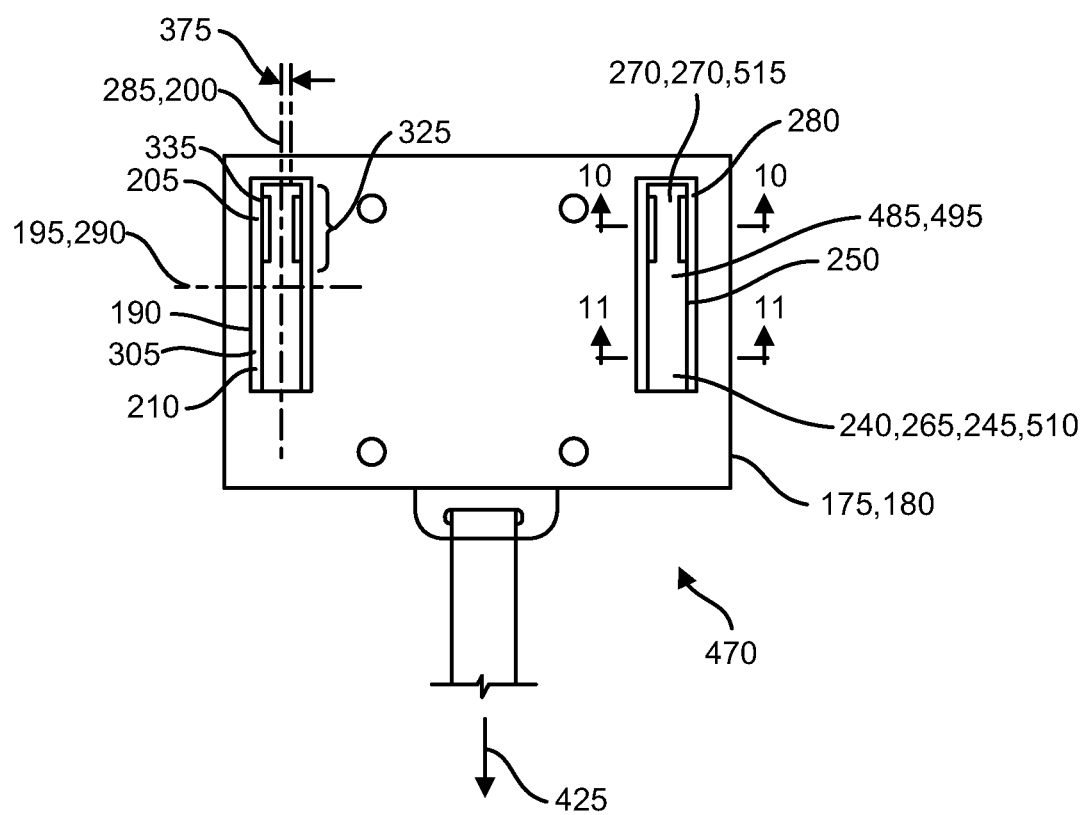

Moving onward, FIG. 6 shows an opposing view of the housing 175 in relation to FIGS. 4 and 5, wherein FIG. 6 shows the housing 175, the surrounding sidewall 180, the first aperture 190, the channel 240, the base 245, the manual sliding movement 425, all in the attached operational state 470, further shown are the extension elements 250, the margins 280, the second protrusion ridge 335, and the first 205 and second 210 chambers of the first aperture 190.

Figure 7:
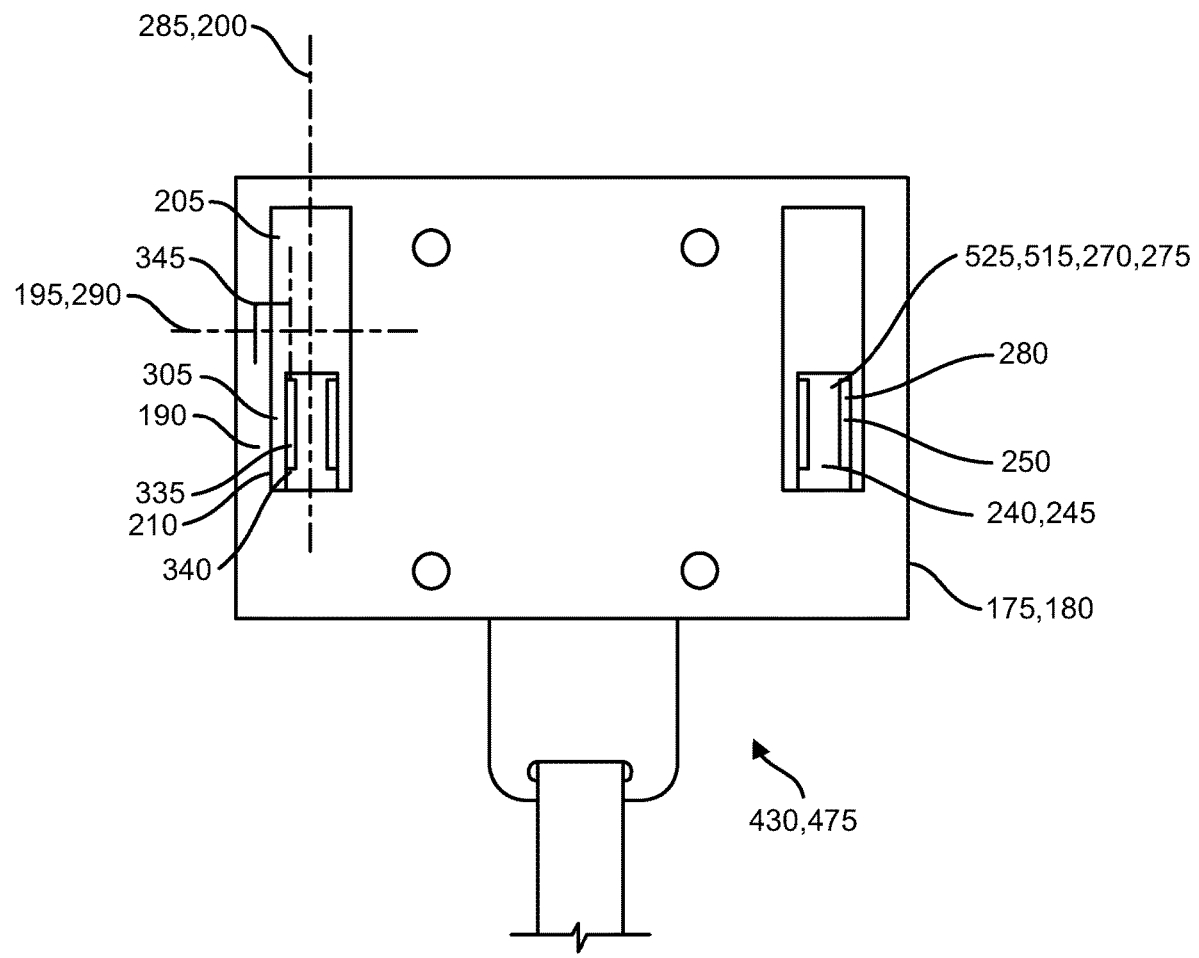

Continuing, FIG. 7 also shows an opposing view of the housing 175 in relation to FIGS. 4 and 5, wherein FIG. 7 shows the housing 175, the surrounding sidewall 180, the first aperture 190, the channel 240, the base 245, the manual fully slid apart interlock position 430 of the channel 240, all in the detached operational state 475, further shown are the extension elements 250, the margins 280, the second protrusion ridge 335, and the first 205 and second 210 chambers of the first aperture 190.

Figure 8:
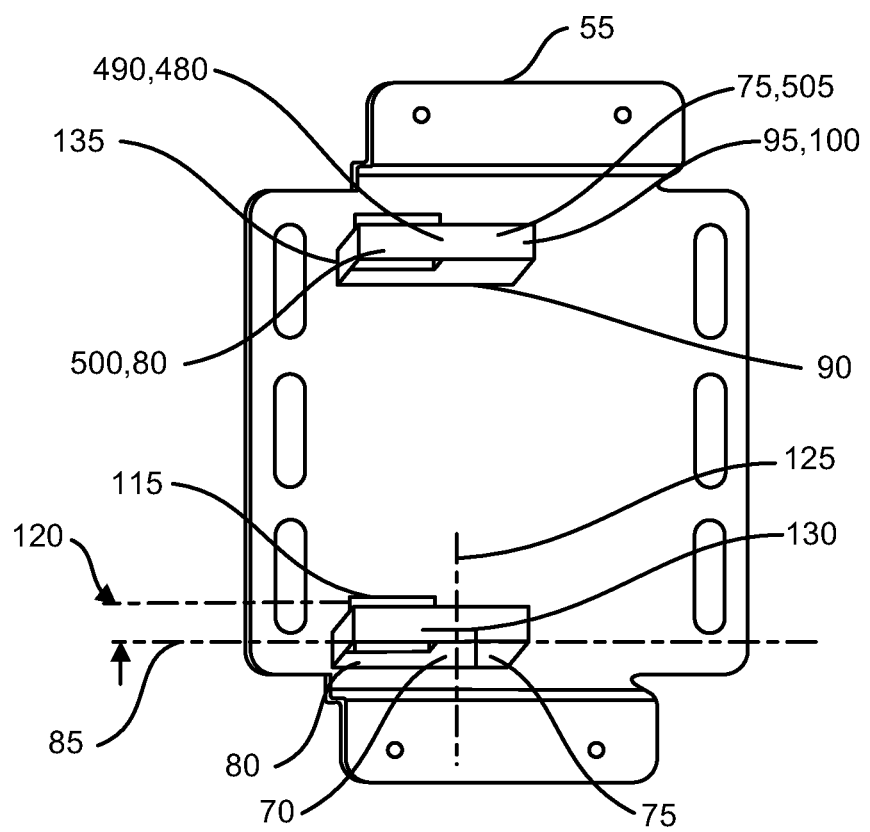
FIG. 8 shows an upper perspective view of the beam in particular, wherein the beam is attached to the first article, wherein the beam is shown with the first and second end portions, the proximal and distal end portions, and the first protrusion ridge.

Next, FIG. 8 shows an upper perspective view of the beam 70 in particular, wherein the beam 70 is attached 135 to the first article 55, wherein the beam 70 is shown with the first 75 and second 80 end portions, the proximal 90 and distal 95 end portions, and the first protrusion ridge 115.

Figure 9:
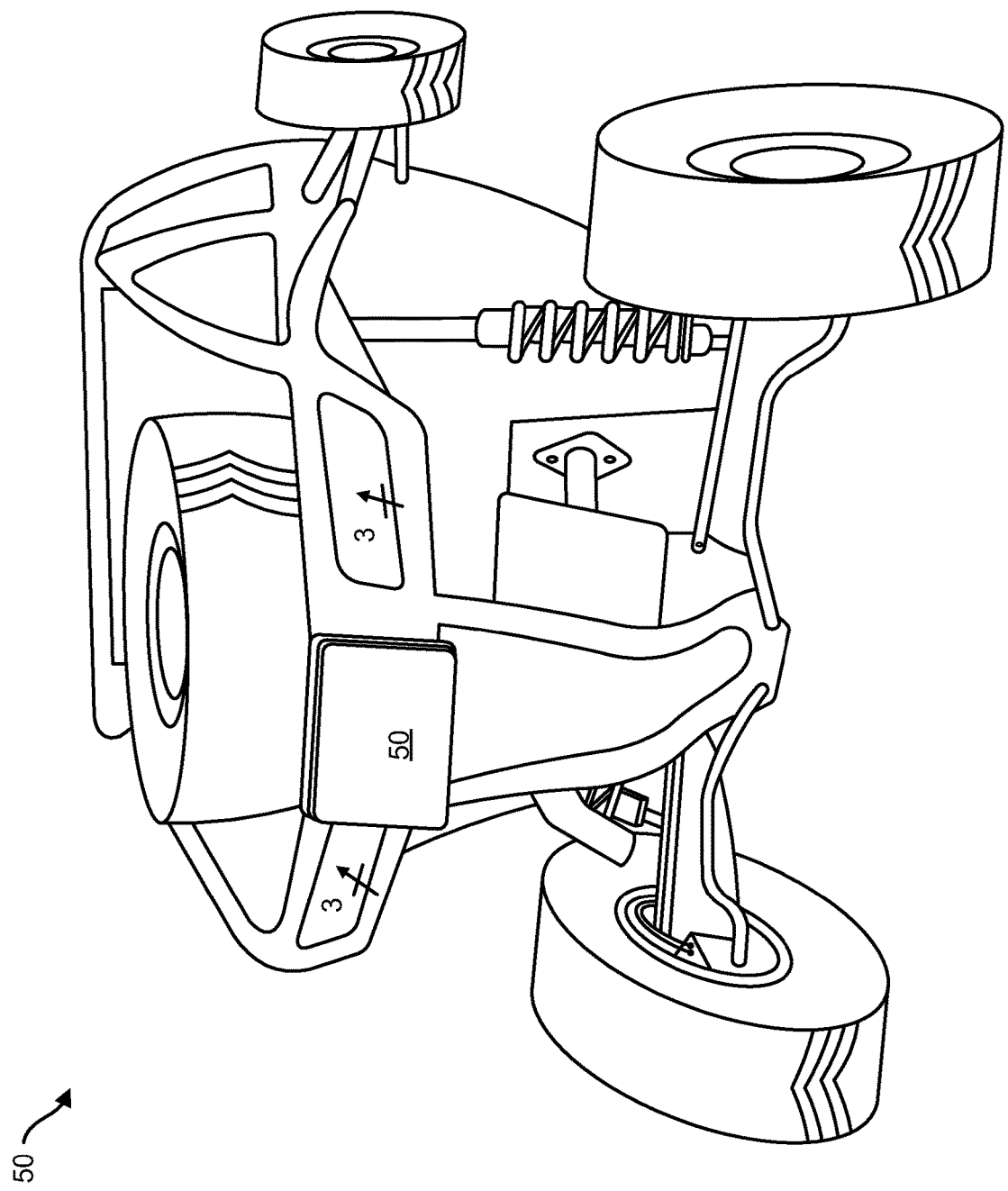
FIG. 9 shows a typical use perspective view of the connecting apparatus with the connecting apparatus attached to an all terrain vehicle to hold for instance a care kit for medical emergencies (first article) that is removably engagable to the all terrain vehicle (second article)

Further, FIG. 9 shows a typical use perspective view of the connecting apparatus 50 with the connecting apparatus 50 attached to an all terrain vehicle to hold for instance a care kit for medical emergencies as the first article 55 that is removably engagable to the all terrain vehicle as the second article 60.

Figure 10:
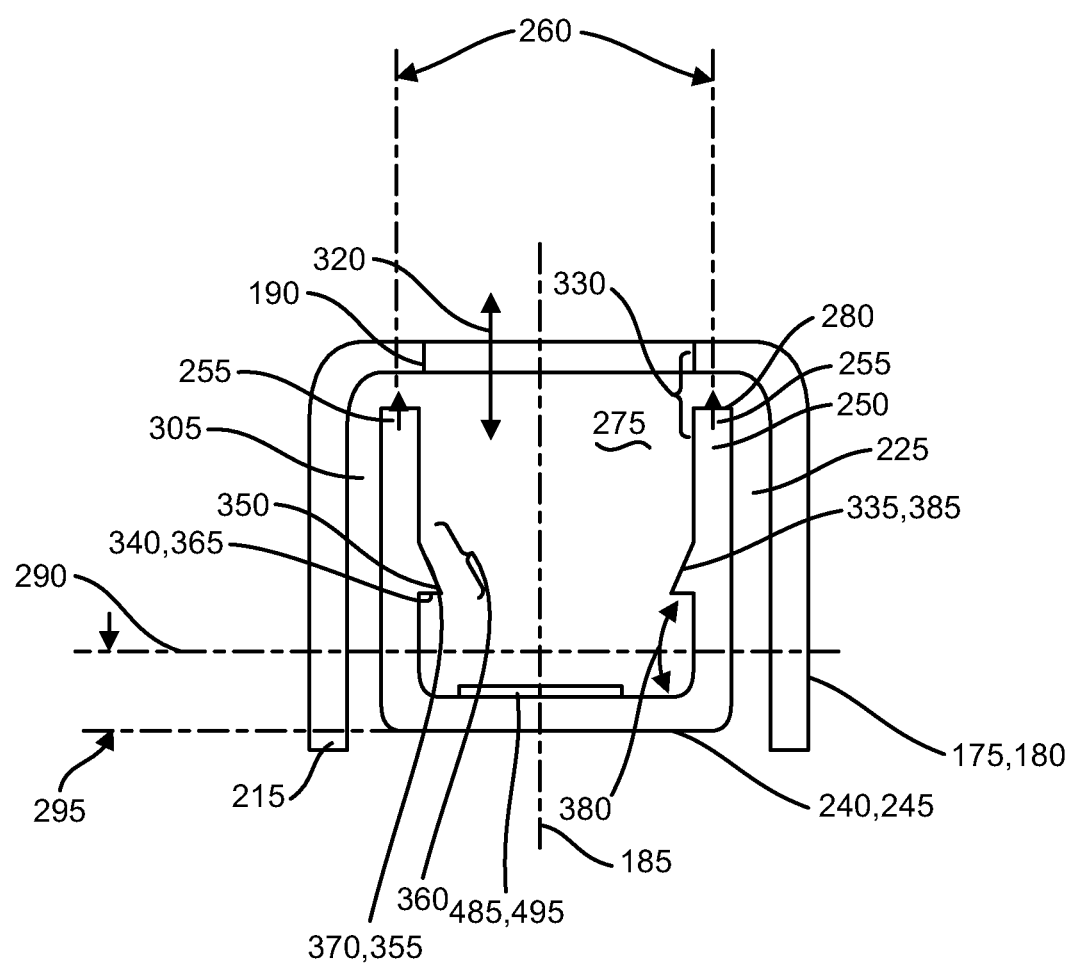

Continuing onward, FIG. 10 is cross section cut 10-10 from FIG. 6, wherein FIG. 10 shows the positional relationship of the housing 175 sidewall 180, first 190 and second 215 apertures and the channel 240 including the base 245, flexible extension elements 250, margins 280, the second protrusion edge 335, and the sizing 330 of the margin 280 to be larger than the first aperture 190.

Figure 11:
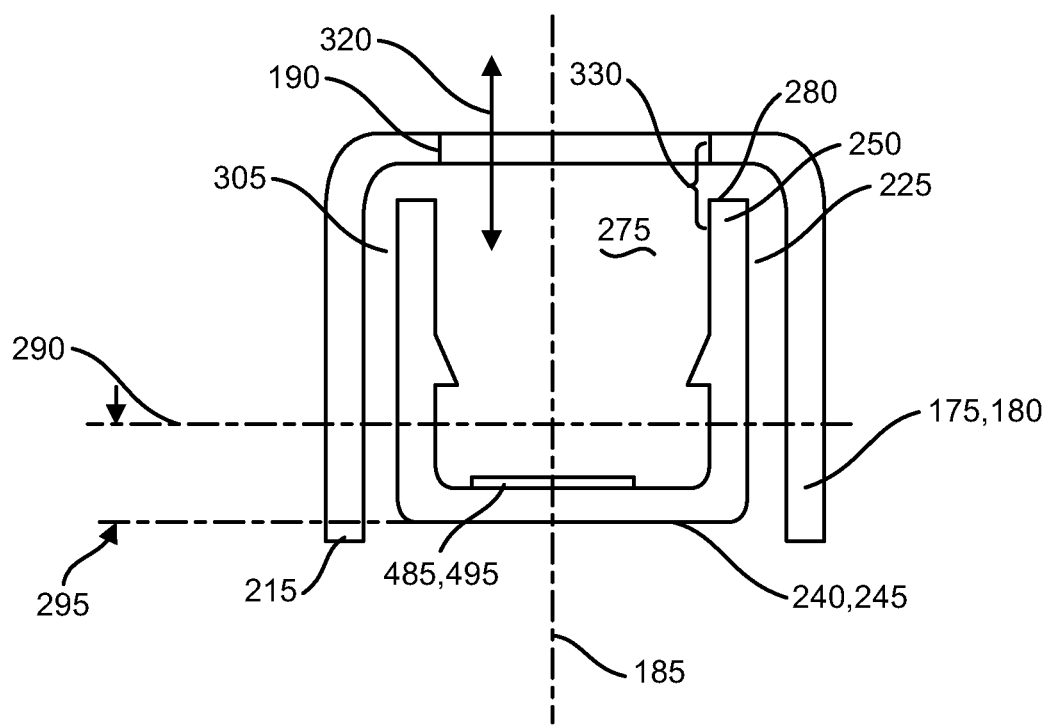

Moving ahead, FIG. 11 is cross section cut 11-11 from FIG. 6, wherein FIG. 11 shows the positional relationship of the housing 175 sidewall 180, first 190 and second 215 apertures and the channel 240 including the base 245, flexible extension elements 250, margins 280, and the sizing 330 of the margin 280 to be larger than the first aperture 190.

Figure 12:
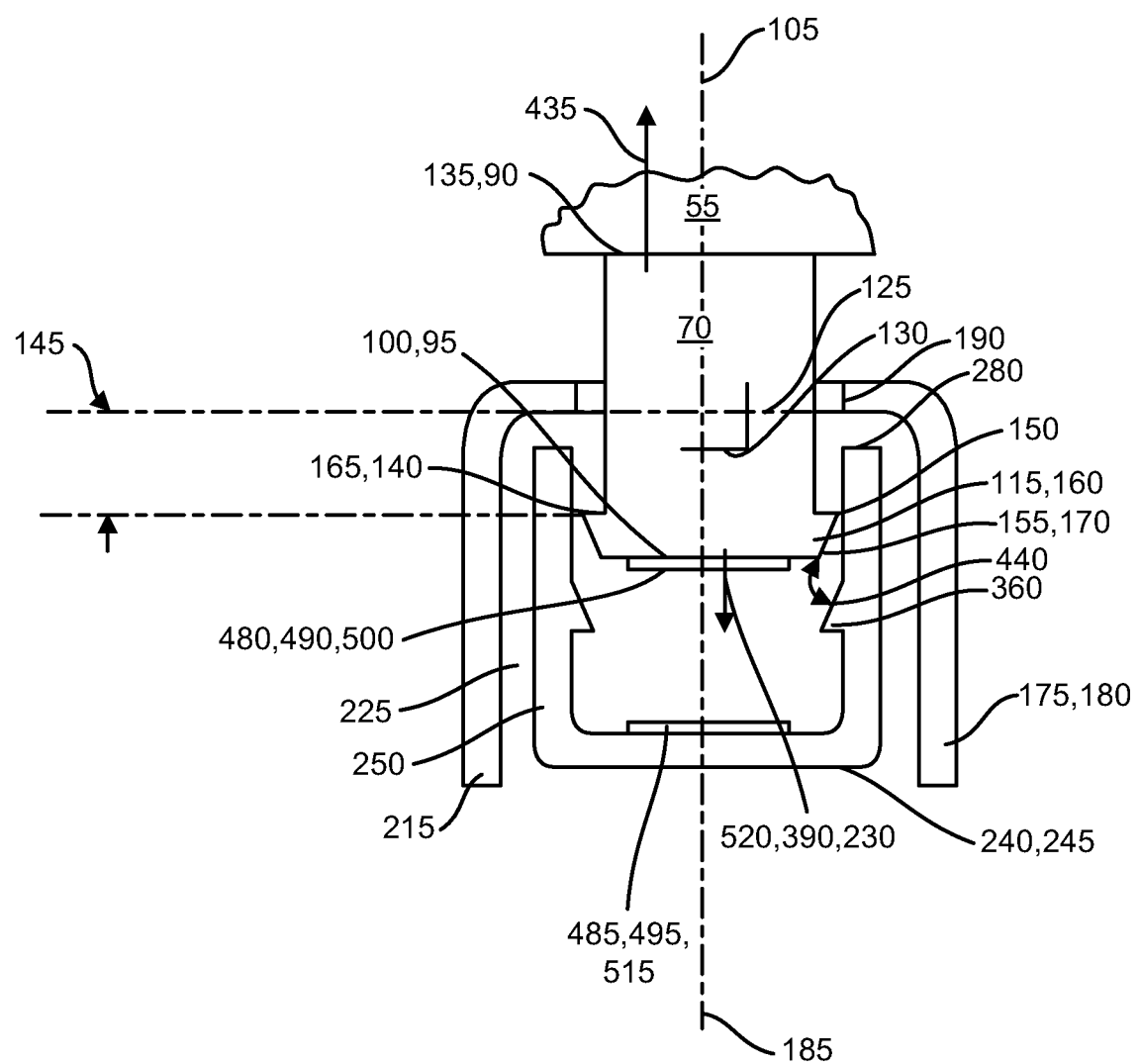

Next. FIG. 12 is cross section cut 12-12 from FIG. 1, wherein FIG. 12 shows the positional relationship of the beam 70 being inserted 230, 390, 520 into the channel 240, wherein also shown is housing 175 sidewall 180, first 190 and second 215 apertures and the channel 240 including the base 245, flexible extension elements 250, margins 280, the second protrusion edge 335, and the sizing 330 of the margin 280 to be larger than the first aperture 190.

Figure 13:
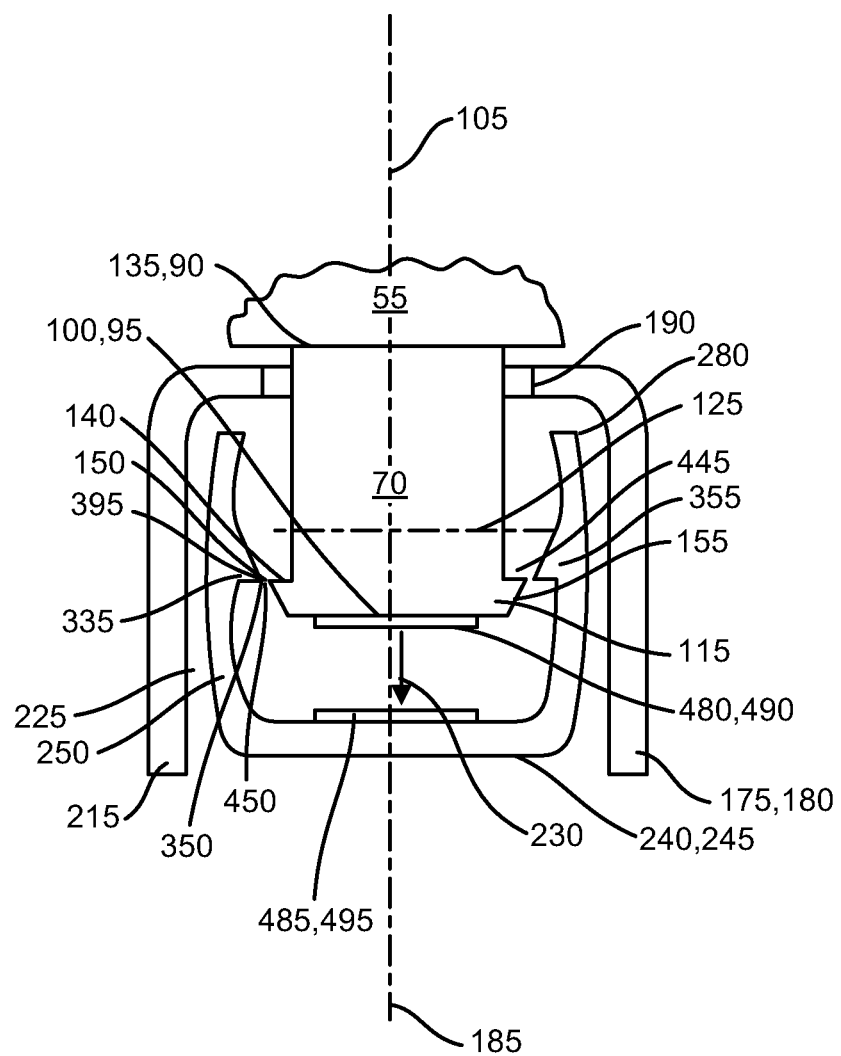

Further shown in FIG. 13 is the cross section cut 13-13 from FIG. 1, wherein FIG. 13 shows the positional relationship of the beam 70 being further inserted 230, 390, 520 into the channel 240, thus contacting and deflecting 395 of the second protrusion edge 335 by the first protrusion edge 115, wherein also shown is housing 175 sidewall 180, first 190 and second 215 apertures and the channel 240 including the base 245, flexible extension elements 250, margins 280, the second protrusion edge 335, and the sizing 330 of the margin 280 to be larger than the first aperture 190.

Figure 14:
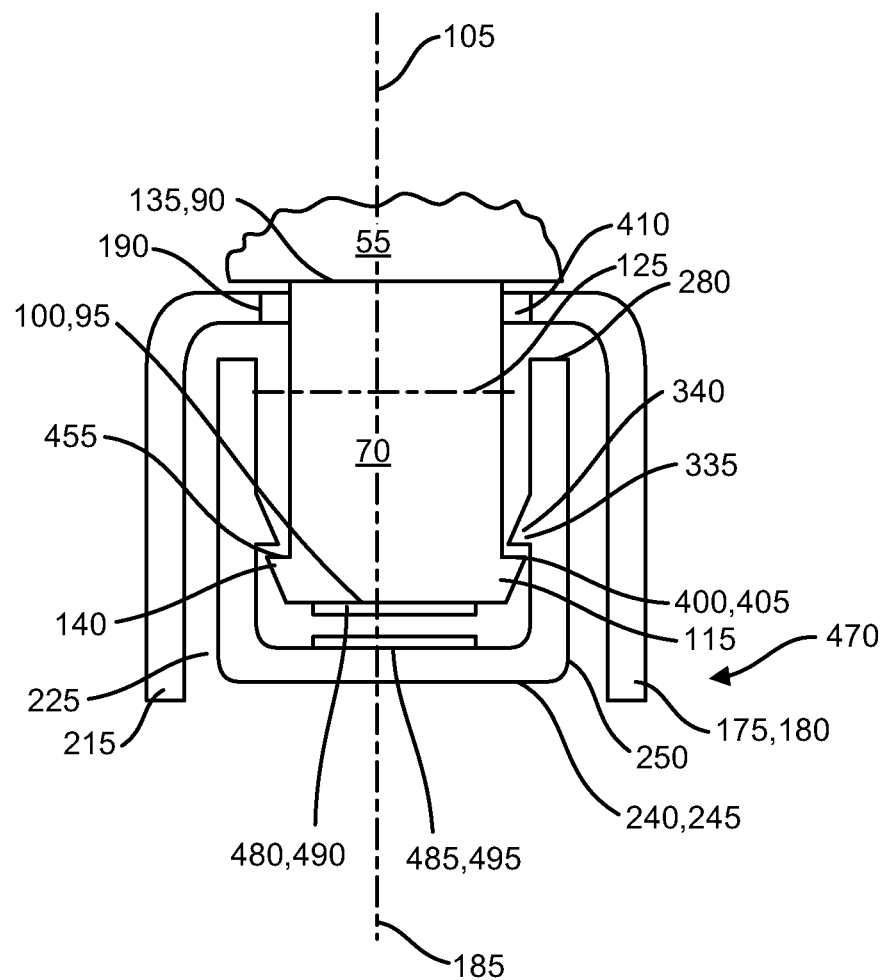

Continuing, FIG. 14 is cross section cut 14-14 from both FIGS. 1 and 3, wherein FIG. 14 shows the positional relationship of the beam 70 being fully inserted into the channel 240, thus forming the interlock 400 as between the second protrusion edge 335 and the first protrusion edge 115, wherein also shown is housing 175 sidewall 180, first 190 and second 215 apertures and the channel 240 including the base 245, flexible extension elements 250, margins 280, the second protrusion edge 335, and the sizing 330 of the margin 280 to be larger than the first aperture 190 with the interlock 400 forming the attached operational state 470.

Broadly, in referring to FIGS. 1 to 14, the present invention is of the connecting apparatus 50 that removably engages 65 the first article 55 to the second article 60, the connecting apparatus 50 including a beam 70 with a first end portion 75 and an opposing second end portion 80 with a longitudinal axis 85 spanning therebetween, the beam 70 also including a proximal end portion 90 and an opposing distal end portion 95 with a plumb axis 105 spanning therebetween, wherein the longitudinal axis 85 and the plumb axis 105 are positioned perpendicular 110 to one another. Further the beam 70 includes a first protrusion ridge 115 that runs parallel 120 to the longitudinal axis 85, wherein the first protrusion ridge 115 is disposed on the beam 70 second end portion 80 and on the distal end portion 95, the beam 70 proximal end portion 90 is adapted to attach 135 to the first article 55, the beam 70 also has a lateral axis 125 that is perpendicular 130 to both the longitudinal axis 85 and the plumb axis 105, as best shown in FIG. 1, see also FIGS. 3, 8, and FIGS. 12 to 14. Although a single beam 70 is claimed the invention could have a plurality of beams 70 utilized.

Further included in the connecting apparatus 50 is a housing 175 that is constructed of a surrounding sidewall 180 that is about a transverse axis 185, the sidewall 180 terminating in a first aperture 190 and an opposing second aperture 215, wherein the transverse axis 185 spans therebetween, the surrounding sidewall 180 and the first 190 and second 215 apertures define a housing interior 225, the housing 175 first aperture 190 is sized to receive 230 the beam 70 distal end portion 95 that is disposed within the housing interior 225, see FIG. 1 also FIGS. 3 to 7, plus FIGS. 10 to 14. The first aperture 190 has a major axis 200 and a perpendicularly positioned minor axis 195 wherein both the major 200 and minor axes 195 are perpendicular to the transverse axis 185, the first aperture 190 is divided into a first chamber 205 and an opposing second chamber 210 such that the first chamber 205 is on one side of the minor axis 195 along the major axis 200 and the second chamber 210 is on an opposing side of the minor axis 195 along the major axis 200, the housing 175 is also adapted to attach 235 to the second article 60, see FIGS. 1, 6, and 7, plus FIGS. 10 to 14. Although a single first aperture 190 and single second aperture 215 are claimed the invention could have a plurality of first 190 and second 215 apertures being utilized.

In addition included in the connecting apparatus 50 is a channel 240 having a base portion 245 and a pair of flexible extension elements 250 that each extend in a same direction 255 being substantially parallel 260 to one another from each side of the base 245, the channel 240 also including a primary end portion 265 and an opposing secondary end portion 270 with an open side 275 formed from a pair of margins 280 of the pair of extension elements 250 such that a lengthwise axis 285 that spans therebetween the primary 265 and secondary 270 end portions, see FIGS. 10 to 14 in particular and FIGS. 1 to 3, plus FIG. 7. Further the channel 240 has a sidewise axis 290 that is positioned parallel 295 to the channel 240 base portion 245 and the sidewise axis 290 is positioned perpendicular 300 to the lengthwise axis 285, the channel 240 is slidably engaged 305 to a portion of the sidewall 180 such that the lengthwise axis 285 is perpendicular 310 to the transverse axis 185 and the lengthwise axis 285 is parallel 315 to the major axis 200, see FIGS. 1 and 4 in particular, in addition to FIGS. 5 to 7, plus FIGS. 10 to 14. Wherein the channel 240 open side 275 is in communication 320 with the housing 175 first aperture 190 and the pair of extension element 250 margins 280 are sized 330 to be larger than the housing 175 first aperture 190 to prevent the channel 240 from extending therethrough the first aperture 190 along the transverse axis 185, see FIGS. 10 to 14 in particular and FIGS. 4 to 7, on one of the flexible extension elements 250 a second protrusion ridge 335 is disposed that runs parallel 375 to the lengthwise axis 285 facing 380 the base 245 on the secondary end portion 270 such that the secondary end portion 270 is adjacent 325 to the first chamber 205 through the slidably engaged 305 channel 240 to the sidewall 180, as best shown in FIGS. 10 to 14, plus see FIGS. 1, 6, and 7. Although a single channel 240 is claimed the invention could have a plurality of channels 240 utilized.

Wherein operationally, the beam 70 distal end portion 95 is manually pushed 390 into the housing 175 first aperture 190 until the first protrusion ridge 115 contacts and deflects 395 the second protrusion ridge 335 on the flexible extension element 250 with the second protrusion ridge 335 returns to an un-deflected state 385 with the first 115 and second 335 protrusion ridges interlocked 400 to one another with the first protrusion ridge 115 being closer to the base portion 245 that the second protrusion ridge 335, as best shown in FIGS. 12, 13, and 14. Wherein the first 115 and second 335 protrusion ridges interlock 400 prevents the beam 70 and the housing 175 from separating 405 along the transverse axis 185 and an interface 410 between the first aperture 190 and the beam 70 precludes movement 420 between the housing 175 and the beam 70 in the longitudinal axis 85 and the lateral axis 125 which results in precluded 405, 420, three axis movement as between the first 55 and second 60 articles in an attached operational state 470, see in particular FIGS. 1 and 14. Further operationally the first 55 and second 60 articles can be separated by having sliding movement 425 of the channel 240 along the lengthwise axis 285 to slide apart 430 the interlock 400 of the first 115 and second 335 protrusion ridges such that the channel 240 secondary end portion 270 is directly adjacent to the beam 70 first end portion 75 and the second chamber 210 thus allowing the beam 70 to separate from the channel 240 along the transverse axis 185, thus separating the first article 55 from the second article 60 in a detached operational state 475, see FIGS. 5 and 7, plus FIGS. 1 and 12.

As an option for the connecting apparatus 50 the beam 70 first protrusion ridge 115 can be constructed of a first shelf section surface 140 that is substantially parallel 145 to the lateral axis 125 wherein the first shelf section 140 extends from the beam 70 to a first boundary 150 that continues onto a first slide surface 155 that extends toward a terminating edge 100 of the distal end portion 95, as best shown in FIGS. 10 to 14, plus FIGS. 1, 3, and 8.

As a further option for the connecting apparatus 50 continuing on the beam 70 first protrusion ridge 115 first shelf section 140, first boundary 150, and first slide surface 155 can substantially form a first side 165 and a first hypotenuse 170 of a first right triangle type shape 160, again as best shown in FIGS. 10 to 14, plus FIGS. 1, 3, and 8.

Alternatively for the connecting apparatus 50 and further concerning the channel 240 second protrusion ridge 335 can be constructed of a second shelf section surface 340 that is substantially perpendicular 345 to the sidewise axis 290, wherein the second shelf section 340 extends from the flexible extension element 250 to a second boundary 350 that continues onto a second slide surface 355 that extends toward the margin 280, as best shown in FIGS. 10 to 14, plus FIGS. 1, 6, and 7.

Continuing alternatively, for the connecting apparatus 50 focusing on the channel 240 second protrusion ridge 335 second shelf section 340, second boundary 350, and second slide surface 355 can substantially form a second side 365 and a second hypotenuse 370 of a second right triangle type shape 360, wherein operationally the first 160 and second 360 right triangle type shapes are opposing mirror images 440 of one another such that prior to the interlock 400 when the first 115 and second 335 protrusion ridges contacts 445 and deflects 395 the second protrusion ridge 335 wherein the first 165 and second 355 slide surfaces contact one another in a substantially parallel manner until said first and second boundaries cross one another 450 and the interlock 400 is formed when said first 140 and second 340 shelf section surfaces come into contact 455 with one another, see in particular FIGS. 12 to 14.

Yet further optionally for the connecting apparatus 50 it can further comprise a means for urging 460 the slidable engagement 305 of the channel 240 to the sidewall 180 portion such that the channel 240 is urged in position such that the secondary end portion 270 is directly adjacent to the first aperture 190 first chamber 205, see in particular FIGS. 4 to 7.

Continuing optionally, for the connecting apparatus 50 wherein the means for urging 460 slidable engagement 305 is preferably constructed of a spring 465 that is disposed and affixed between the channel 240 and the housing 175, see again FIGS. 4 to 7. Wherein operationally the channel 240 and the housing 175 will be urged in relative position to facilitate forming the interlock 400 in the attached operational state 470 and further operationally the first 55 and second 60 articles can be separated by manually initiating sliding movement 425 of the channel 240 within the housing 175 in opposition to the urging 460 of the channel 240 along the lengthwise axis 285 to slide 425 apart 430 the interlock 400 of the first 115 and second 335 protrusion ridges such that the channel 240 secondary end portion 270 is directly adjacent to the beam 70 first end portion 75 and the first aperture 190 second chamber 210 in the detached operational state 475 allowing the beam 70 to separate 435 from the channel 240 along the transverse axis 185, see in particular FIGS. 1, 5, 7, and 10 to 12.

Another alternative on the connecting apparatus 50 is for the beam 70 to have a first magnet 480 disposed on the beam 70 distal portion 95 and further the channel 240 has a second magnet 485 disposed on the base portion 245, see FIGS. 12 to 14.

Wherein operationally the beam 70 distal end portion 95 is manually pushed 390 and attracted by the first 480 and second 485 magnets into the housing 175 first aperture 190 until the first protrusion ridge 115 contacts and deflects 395 the second protrusion ridge 335 on the flexible extension element 250 with the second protrusion ridge 335 returns to an un-deflected state 385 with the first 115 and second 335 protrusion ridges interlocked 400 to one another with the first protrusion ridge 115 being closer to the base portion 245 that the second protrusion ridge 335, as best shown in FIGS. 12, 13, and 14. Wherein the first 115 and second 335 protrusion ridges interlock 400 prevents the beam 70 and the housing 175 from separating 405 along the transverse axis 185 and an interface 410 between the first aperture 190 and the beam 70 precludes movement 420 between the housing 175 and the beam 70 in the longitudinal axis 85 and the lateral axis 125 which results in precluded 405, 420 three axis movement as between the first 55 and second 60 articles in a attached operational state 470, see in particular FIGS. 1 and 14. Further operationally the first 55 and second 60 articles can be separated by having sliding movement 425 of the channel 240 along the lengthwise axis 285 to slide apart 430 the interlock 400 of the first 115 and second 335 protrusion ridges such that the channel 240 secondary end portion 270 is directly adjacent to the beam 70 first end portion 75 and the second chamber 210 thus allowing the beam 70 to separate from the channel 240 along said transverse axis 185, thus separating the first article 55 from the second article 60 in a detached operational state 475, see FIGS. 5 and 7, plus FIGS. 1 and 12.

As a continuing option for the first 480 and second 485 magnets on the connecting apparatus 50 wherein the beam 70 first magnet 480 is a first permanent magnet 490 that is affixed and positioned such that a first north pole 500 is disposed on the second end portion 80 and a first south pole 505 is disposed on the first end portion 75 and the channel 240 second magnet 485 is a second permanent magnet 495 that is affixed and positioned such that a second north pole 510 is disposed on the primary end portion 265 and a second south pole 515 is disposed on the secondary end portion 270, see FIGS. 10 to 14, plus FIGS. 6 and 7. Wherein operationally when the beam 70 second end portion 80 is directly adjacent to the channel 240 secondary end portion 270 the first 490 and second 495 permanent magnets have attracting 520 opposite north 500 and south 515 poles to one another to help in achieving the interlock 400 wherein when the channel 240 is moved via the sliding movement 425 to slide apart 430 the interlock 400 such that the channel 240 secondary end portion 270 is directly adjacent to the beam 70 first end portion 75 the first 490 and second 495 permanent magnets have repelling 525 like south 505 and south 515 poles to one another to help in achieving the beam 70 to separate from the channel 240 along the transverse axis 185, thus separating the first 55 article from the second article 60 in the detached operational state 475, see FIGS. 5 and 7, plus FIGS. 1, 3, 4 6, 8, and 10 to 12. Although the first 480, 490, 500, 505 and second 485, 495, 510, 515 magnets are claimed as a single group, there could be multiple groups of the first 480, 490, 500, 505 and second 485, 495, 510, 515 magnets utilized in the invention.

CONCLUSION

Accordingly, the present invention of a connecting apparatus 50 has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A connecting apparatus that removably engages a first article to a second article for mounting on a vehicle, said connecting apparatus comprising:
   (a) a beam including a first end portion and an opposing second end portion with a longitudinal axis spanning therebetween, said beam also including a proximal end portion and an opposing distal end portion with a plumb axis spanning therebetween, wherein said longitudinal axis and said plumb axis are positioned perpendicular to one another, further said beam includes a first protrusion ridge that runs parallel to said longitudinal axis, wherein said first protrusion ridge is disposed on said beam second end portion and on said distal end portion, said beam proximal end portion is adapted to attach to the first article, said beam also has a lateral axis that is perpendicular to both said longitudinal axis and said plumb axis;
   (b) a housing that is constructed of a surrounding sidewall that is about a transverse axis, said sidewall terminating in a first aperture and an opposing second aperture, wherein said transverse axis spans therebetween, said surrounding sidewall and said first and second apertures define a housing interior, said housing first aperture is sized to receive said beam distal end portion that is disposed within said housing interior, said first aperture has a major axis and a perpendicularly positioned minor axis wherein both said major and minor axes are perpendicular to said transverse axis, said first aperture is divided into a first chamber and an opposing second chamber such that said first chamber is on one side of said minor axis along said major axis and said second chamber is on an opposing side of said minor axis along said major axis, said housing is also adapted to attach to the second article; and
   (c) a channel having a base portion and a pair of flexible extension elements that each extend in a same direction being substantially parallel to one another from each side of said base, said channel also including a primary end portion and an opposing secondary end portion with an open side formed from a pair of margins of said pair of extension elements such that a
   lengthwise axis that spans therebetween said primary and secondary end portions, further said channel has a sidewise axis that is positioned parallel to said channel base portion and said sidewise axis is positioned perpendicular to said lengthwise axis, said channel is slidably engaged to a portion of said sidewall such that said lengthwise axis is perpendicular to said transverse axis and said lengthwise axis is parallel to said major axis, wherein said channel open side is in communication with said housing first aperture and said pair of extension element margins are sized to be larger than said housing first aperture to prevent said channel from extending therethrough said first aperture along said transverse axis, on one of said flexible extension elements a second protrusion ridge is disposed that runs parallel to said lengthwise axis facing said base on said secondary end portion such that said secondary end portion is adjacent to said first chamber through said slidably engaged channel to said sidewall, a means for urging said slidable engagement of said channel to said sidewall portion such that said channel is urged in position such that said secondary end portion is directly adjacent to said first aperture first chamber, wherein operationally said beam distal end portion is manually pushed into said housing first aperture until said first protrusion ridge contacts and deflects said second protrusion ridge on said flexible extension element with said second protrusion ridge returns to an un-deflected state with said first and second protrusion ridges interlocked to one another with said first protrusion ridge being closer to said base portion that said second protrusion ridge, wherein said first and second protrusion ridges interlock prevents said beam and said housing from separating along said transverse axis and an interface between said first aperture and said beam precludes movement between said housing and said beam in said longitudinal axis and said lateral axis which results in precluded three axis movement as between the first and second articles in an attached operational state, further operationally the first and second articles can be separated by having sliding movement of said channel along said lengthwise axis to slide apart said interlock of said first and second protrusion ridges such that said channel secondary end portion is directly adjacent to said beam first end portion and said second chamber thus allowing said beam to separate from said channel along said transverse axis, thus separating the first article from the second article in a detached operational state.

2. A connecting apparatus according to claim 1 wherein said beam first protrusion ridge is constructed of a first shelf section surface that is substantially parallel to said lateral axis wherein said first shelf section extends from said beam to a first boundary that continues onto a first slide surface that extends toward a terminating edge of said distal end portion.

3. A connecting apparatus according to claim 2 wherein said beam first protrusion ridge first shelf section, first boundary, and first slide surface substantially form a first side and a first hypotenuse of a first right triangle type shape.

4. A connecting apparatus according to claim 3 wherein said channel second protrusion ridge is constructed of a second shelf section surface that is substantially perpendicular to said sidewise axis wherein said second shelf section extends from said flexible extension element to a second boundary that continues onto a second slide surface that extends toward said margin.

5. A connecting apparatus according to claim 4 wherein said channel second protrusion ridge second shelf section, second boundary, and second slide surface substantially form a second side and a second hypotenuse of a second right triangle type shape, wherein operationally said first and second right triangle type shapes are opposing mirror images of one another such that prior to said interlock when said first and second protrusion ridges contacts and deflects second protrusion ridge wherein said first and second slide surfaces contact one another in a substantially parallel manner until said first and second boundaries cross one another and said interlock is formed when said first and second shelf section surfaces come into contact with one another.

6. A connecting apparatus according to claim 1 wherein said means for urging said slidable engagement is constructed of a spring that is disposed and affixed between said channel and said housing, wherein operationally said channel and said housing will be urged in relative position to facilitate forming said interlock in said attached operational state and further operationally the first and second articles can be separated by manually initiating sliding movement of said channel within said housing in opposition to said urging of said channel along said lengthwise axis to slide apart said interlock of said first and second protrusion ridges such that said channel secondary end portion is directly adjacent to said beam first end portion and said first aperture second chamber in said detached operational state allowing said beam to separate from said channel along said transverse axis.

7. A connecting apparatus that removably engages a first article to a second article for mounting on a vehicle, said connecting apparatus comprising:
(a) a beam including a first end portion and an opposing second end portion with a longitudinal axis spanning therebetween, said beam also including a proximal end portion and an opposing distal end portion with a plumb axis spanning therebetween, wherein said longitudinal axis and said plumb axis are positioned perpendicular to one another, further said beam includes a first protrusion ridge that runs parallel to said longitudinal axis, wherein said ridge is disposed on said beam second end portion and on said distal end portion, said beam proximal end portion is adapted to attach to the first article, said beam also has a lateral axis that is perpendicular to both said longitudinal axis and said plumb axis, further said beam has a first magnet disposed on said beam distal end portion;
(b) a housing that is constructed of a surrounding sidewall that is about a transverse axis, said sidewall terminating in a first aperture and an opposing second aperture, wherein said transverse axis spans therebetween, said surrounding sidewall and said first and second apertures define a housing interior, said housing first aperture is sized to receive said beam distal end portion that is disposed within said housing interior, said first aperture has a major axis and a perpendicularly positioned minor axis wherein both said major and minor axes are perpendicular to said transverse axis, said first aperture is divided into a first chamber and an opposing second chamber such that said first chamber is on one side of said minor axis along said major axis and said second chamber is on an opposing side of said minor axis along said major axis, said housing is also adapted to attach to the second article; and
(c) a channel having a base portion and a pair of flexible extension elements that each extend in a same direction being substantially parallel to one another from each side of said base, said channel also including a primary end portion and an opposing secondary end portion with an open side formed from a pair of margins of said pair of extension elements such that a lengthwise axis that spans therebetween said primary and secondary end portions, further said channel has a sidewise axis that is positioned parallel to said channel base portion and said sidewise axis is positioned perpendicular to said lengthwise axis, further said channel has a second magnet disposed on said base portion, said channel is slidably engaged to a portion of said sidewall such that said lengthwise axis is perpendicular to said transverse axis and said lengthwise axis is parallel to said major axis, wherein said channel open side is in communication with said housing first aperture and said pair of extension element margins are sized to be larger than said housing first aperture to prevent said channel from extending therethrough said first aperture along said transverse axis, on one of said flexible extension elements a second protrusion ridge is disposed that runs parallel to said lengthwise axis facing said base on said secondary end portion such that said secondary end portion is adjacent to said first chamber through said slidably engaged channel to said sidewall, a means for urging said slidable engagement of said channel to said sidewall portion such that said channel is urged in position such that said secondary end portion is directly adjacent to said first aperture first chamber, wherein operationally said beam distal end portion is manually pushed and attracted by said first and second magnets into said housing first aperture until said first protrusion ridge contacts and deflects said second protrusion ridge on said flexible extension element with said second protrusion ridge returns to an un-deflected state with said first and second protrusion ridges interlocked to one another with said first protrusion ridge being closer to said base portion that said second protrusion ridge, wherein said first and second protrusion ridges interlock prevents said beam and said housing from separating along said transverse axis and an interface between said first aperture and said beam precludes movement between said housing and said beam in said longitudinal axis and said lateral axis which results in precluded three axis movement as between the first and second articles in an attached operational state, further operationally the first and second article can be separated by having sliding movement of said channel along said lengthwise axis to slide apart said interlock of said first and second protrusion ridges such that said channel secondary end portion is directly adjacent to said beam first end portion and said second chamber thus allowing said beam to separate from said channel along said transverse axis, thus separating the first article from the second article in a detached operational state.

8. A connecting apparatus according to claim 7 wherein said beam first magnet is a first permanent magnet that is affixed and positioned such that a first north pole is disposed on said second end portion and a first south pole is disposed on said first end portion and said channel second magnet is a second permanent magnet that is affixed and positioned such that a second north pole is disposed on said primary end portion and a second south pole is disposed on said secondary end portion, wherein operationally when said beam second end portion is directly adjacent to said channel secondary end portion said first and second permanent magnets have attracting opposite north and south poles to one another to help in achieving said interlock wherein when said channel is moved via said sliding movement to slide apart said interlock such that said channel secondary end portion is directly adjacent to said beam first end portion said first and second permanent magnets have repelling like south and south poles to one another to help in achieving said beam to separate from said channel along said transverse axis, thus separating the first article from the second article.

9. A connecting apparatus according to claim 8 wherein said beam first protrusion ridge is constructed of a first shelf section surface that is substantially perpendicular to said lateral axis wherein said first shelf section extends from said beam to a first boundary that continues onto a first slide surface that extends toward a terminating edge of said distal end portion.

10. A connecting apparatus according to claim 9 wherein said beam first protrusion ridge first shelf section, first boundary, and first slide surface substantially form a first side and a first hypotenuse of a first right triangle type shape.

11. A connecting apparatus according to claim 10 wherein said channel second protrusion ridge is constructed of a second shelf section surface that is substantially perpendicular to said sidewise axis wherein said second shelf section extends from said flexible extension element to a second boundary that continues onto a second slide surface that extends toward said margin.

12. A connecting apparatus according to claim 11 wherein said channel second protrusion ridge second shelf section, second boundary, and second slide surface substantially form a second side and a second hypotenuse of a second right triangle type shape, wherein operationally said first and second right triangle type shapes are opposing mirror images of one another such that prior to said interlock when said first and second protrusion ridges contacts and deflects second protrusion ridge wherein said first and second slide surfaces contact one another in a substantially parallel manner until said first and second boundaries cross one another and said interlock is formed when said first and second shelf section surfaces come into contact with one another.

13. A connecting apparatus according to claim 7 wherein said means for urging said slidable engagement is constructed of a spring that is disposed and affixed between said channel and said housing, wherein operationally said channel and said housing will be urged in relative position to facilitate forming said interlock in said attached operational state and further operationally the first and second articles can be separated by manually initiating sliding movement of said channel within said housing in opposition to said urging of said channel along said lengthwise axis to slide apart said interlock of said first and second protrusion ridges such that said channel secondary end portion is directly adjacent to said beam first end portion and said first aperture second chamber allowing said beam to separate from said channel along said transverse axis in said detached operational state.

* * * * *